Patented Dec. 9, 1947

UNITED STATES PATENT OFFICE 2,432,148

CURING OF DIISOCYANATE-MODIFIED POLYESTER

Will Furness, Lyle E. Perrins, and Walter Fairbairn Smith, Blackley, Manchester, England, assignors to Imperial Chemical Industries Limited, a corporation of Great Britain No Drawing. Application March 14, 1944, Serial No. 526,476. In Great Britain February 10, 1943

2 Claims. (Cl. 260—43)

This invention relates to improvements in the curing of polymeric organic materials more especially in the curing of organic diisocyanate modified polyesters or polyester-amides.

Polyesters and polyester-amides are obtained by heating a glycol and/or an amino alcohol with a dibasic carboxylic acid, optionally in the presence of one or more additional ingredients, namely a diamine, an aminocarboxylic acid or a hydroxycarboxylic acid; alternatively, one or more of the ingredients may be used in the form of the corresponding ester- or amide-forming derivatives. In order to obtain linear polymers, the amounts of the various ingredients are selected so that there are present approximately chemically equivalent proportions of their complementary ester-forming groups and also of their complementary amide-forming groups, if amide-forming ingredients are used. The linear polyesters or the linear polyester-amides which may be obtained in this way are usually soft, waxy materials with a relatively low molecular weight.

It has been proposed to convert these soft, waxy, low molecular weight linear polymers into tough polymers of considerably higher molecular weight by heating them with small proportions of an organic diisocyanate, for example ethylene diisocyanate, trimethylene diisocyanate, tetramethylene diisocyanate, hexamethylene, diisocyanate, decamethylene diisocyanate, m-phenylene diisocyanate and naphthalene diisocyanates.

Furthermore, it has been proposed so to treat such low molecular weight linear polymers which have been obtained by reacting the several ingredients in such proportions that there is present in the reaction mixture a small excess of an alcoholic hydroxyl-containing ingredient over and above that theoretically required. If just sufficient of the isocyanate to react with the end groups in the low molecular weight linear polymers is used in their conversion into the high molecular weight polymers, there are obtained linear polymers which can be extruded into cold-drawable filaments. However, if greater proportions of the isocyanate are used, there are obtained tough, rubbery, partly cross-linked, high molecular weight polymers which cannot be extruded into cold-drawable filaments. Whatever proportions of the isocyanate are reacted with the linear polyesters or polyester-amides, we shall refer to the resulting polymers collectively as organic isocyanate modified polyesters or polyester-amides, and it is with these modified polymers that the present invention is concerned.

As polyester- and polyamide-forming reactants suitable for making the soft, waxy, low molecular weight linear polymers, there may be used glycols, for example, ethylene glycol, diethylene glycol, triethylene glycol, pentamethylene glycol, hexamethylene glycol, decamethylene glycol, dodecamethylene glycol, 1:12-octadecanediol, and pentaglycol; aliphatic or aromatic aminoalcohols having at least one hydrogen atom attached to the amino nitrogen atom and preferably containing a saturated aliphatic chain of at least two carbon atoms separating the amino and hydroxyl groups, for example, ethanolamine and 3-aminopropanol; dibasic carboxylic acids or ester-forming derivatives thereof, preferably saturated or unsaturated aliphatic dicarboxylic acids, for example, malonic, succinic, glutaric, suberic, azelaic, beta-methyladipic, adipic, pimelic, undecanedioic, brassylic, isophthalic, hexahydroterephthalic, p-phenylene-diacetic, dihydromuconic, and acetone-dicarboxylic acids; diamines such as ethylenediamine, hexamethylenediamine, 3-methylhexamethylenediamine, decamethylenediamine and m-phenylenediamine; monohydroxymonocarboxylic acids or their ester-forming derivatives, for example, glycollic, 6-hydroxycaproic, 10-hydroxydecanoic and 12-hydroxystearic acids; polymerizable monoaminomonocarboxylic acids or their amide-forming derivatives, for example, 6-aminocaproic acid or its amide-forming derivative caprolactam, 9-aminononanoic, 11-aminoundecanoic and 12-aminostearic acids.

The low molecular weight polymers are made by heating the selected ingredients at polymerizing temperatures, usually in the absence of air or oxygen, in the first place usually in the presence of water, and later under conditions whereby water is removed from the reaction mixture. When using a diamine as one of the ingredients, it is convenient to use it as the corresponding diammonium salt formed from some of the dibasic carboxylic acid to be used.

The low molecular weight, linear polyesters or polyester-amides are converted into the high molecular weight polymers by mixing them, for example by stirring, milling or kneading, with the organic diisocyanate and then simultaneously and/or subsequently heating the mixture, for example to a temperature of 120 to 200° C., for a period of about 10 to 120 minutes. Up to about 10% and usually between 3% and 7% of the isocyanate is used. The polymers modified with diisocyanates may be polyesters having no recurring intralinear carbonamide groups or they may be polyester-amides having a ratio of intralinear ester to carbonamide groups of 1:1, as in the case of polyesters made from dibasic acids and ethanolamine or having a higher ratio of ester to amide groups.

In the specification of British application No. 13,204/41 (U. S. Serial No. 466,356, filed November 20, 1942) it has been proposed to cure organic diisocyanate modified polyesters or polyester-amides by heating these in the presence of formaldehyde or of a formaldehyde-liberating substance and in the presence or absence of materials which function as curing catalysts, namely, acids, acid anhydrides or acid-reacting salts. As formaldehyde-liberating substances there are mentioned therein polymerides of formaldehyde, such as paraformaldehyde and trioxane; compounds containing a reactive methylol group or groups such as dimethylolurea, trimethylolmelamine, hexamethylolmelamine, diphenylolpropane tetraalcohol, methylolchloracetamide, methylolstearamide and N-methylol-p-toluenesulphonamide; ethers of compounds containing a reactive methylol group or groups sch as di-methylolurea dimethyl ether, dimethylolurea dibutyl ether and N:N'-dimethyloluron dimethyl ether (Chemical Abstracts, 30, (1936), 5944-5); 1:2-glycol methylene ether, di-(β-hydroxyethyl) formal and hexamethylene tetramine-zinc chloride complexes, as well as thermo-hardening phenol-formaldehyde condensation products derived by alkaline condensation from phenols with more than two free positions ortho and para to the phenolic hydroxyl group.

In the specification of British application No. 7392/42 (U. S. Serial No. 484,444, filed May 25, 1943) it has been proposed to cure organic diisocyanate modified polyesters or polyester-amides in a manner similar to that of the above mentioned prior proposal, but differing in that there are used, as curing catalysts, materials which are substantially neutral and remain so during temperatures obtaining during milling or other pre-curing operation but which develop acidity at temperatures attained during curing.

The present invention is directed to improving the properties of the rubber-like cured materials obtainable in accordance with these prior proposals.

We have found that, when a proportion of a thermo-hardening phenol-formaldehyde condensation product derived from a phenol with more than two free positions ortho and para to the phenolic hydroxyl group or groups is brought into admixture with an organic diisocyanate modified polyester or polyester-amide and, as a curing agent, a non-phenolic formaldehyde-liberating substance and also a curing catalyst, then the cured materials obtainable therefrom are endowed with improved physical properties, more especially with improved heat-ageing properties.

Thus, according to the present invention, in the process of curing organic diisocyanate modified polyesters or polyester-amides in the presence of a non-phenolic formaldehyde-liberating substance and of a curing catalyst of the kind hereinbefore described, we provide the improvement which comprises effecting the curing also in the presence of a thermo-hardening phenol-formaldehyde condensation product derived from a phenol with more than two free positions ortho and para to the phenolic hydroxyl group or groups.

As non-phenolic formaldehyde-liberating substances, that is to say, formaldehyde-liberating substances which are not derived from phenols, there may be used those materials of this kind described in the specification of British application No. 13,204/41 (U. S. Serial No. 466,356, filed Nov. 20, 1942).

As curing catalysts there may be used, for example, organic acids such as formic, glycollic, oxalic, succinic, maleic, adipic, tartaric, salicylic, anthranilic, phthalic, citric and tannic acids; inorganic acids such as boric and phosphoric acids; acid anhydrides such as phthalic or maleic anhydrides or functional derivatives of these for example, phthalimide; acid-reacting salts such as potassium or sodium dihydrogen phosphate; and materials which are substantially neutral but which develop acidity under curing conditions such as, butadiene sulphone, 2:3-dimethylbutadiene sulphone, butadiene tetrabromide, styrene dibromide, acetylene tetrabromide, tribromohydroquinone, 1-bromo-2-naphthol, 1:6-dibromo-2-naphthol, 1:4:6-tribromo-2-naphthol, 2:4-dibromo-1-naphthol, methyl α:β-dibromopropionate, β - chloroethyl -α:β- dibromoisobutyrate, ethyl α-bromopropionate, phenyl trichloroacetate, α:α:β-trichloropropionitrile, trichloroacetamide, trichloroacetyldiethylamide, N-trichloroacetylanilide, N:N'-di-(trichloroacetyl)-methylenediamine, N:N' - di - (trichloroacetyl)-ethylenediamine, interpolymers of asymmetrical dichloroethylene and vinyl chloride, and chloranil (tetrachloro-p-benzoquinone).

As the thermo-hardening phenol-formaldehyde condensation products there may be used, for example, those derived from phenol, m-cresol, diphenylolpropane, 1:3:5-xylenol, resorcinol or mixtures containing at least one such phenol, for example, cresylic acid containing 40-50% by weight of m-cresol, or the products obtained by condensing such phenol-formaldehyde resins or their components with monohydric alcohols boiling above 80° C. Preferably the condensation products are resins, for example those obtained by condensing together, in presence of sodium hydroxide, phenol or 1:3:5-xylenol or diphenylolpropane or m-cresol with aqueous formaldehyde, or by condensing diphenylolpropane and formaldehyde with butanol or cyclohexanol.

As well as the ingredients already mentioned one or more additional ingredients may also be used. These include non-basic fillers, for example carbon black, clay, asbestos, blanc fixe and mica; other plastic materials for example, natural or synthetic rubbers, vulcanised vegetable oils, dark substitute, white substitute, a coumarone resin, wood rosin and pitch; detackifying agents, for example, stearic acid, paraffin wax, oleic acid and lauric acid; plasticisers, for example, tricresyl phosphate, dibutyl phthalate, butylphthalyl butyl glycollate and N-alkyl-toluene - sulphonamides; stabilisers or anti-oxidants, for example, hydroquinone N:N'-hexamethylene-bis - o - hydroxybenzamide, N-phenyl-α-naphthylamine, N-phenyl-β-naphthylamine and α:α:-bis(2-hydroxy -3:5- dimethylphenyl-butane. Small quantities of non-basic pigments, for example from 1-3% by weight such as are customarily used in rubber technology may also be used to impart colour. Small amounts of acid-accepting materials may be used to obviate or minimise scorching. This expedient is described in Buist et al. U. S. application Serial No. 522,801, filed Feb. 17, 1944.

The invention is carried into practical effect in the manner described in the above mentioned specifications. Usually the several ingredients are mixed together, conveniently on a rubber mill, at a temperature below which there is an appreciable tendency for curing to take place on the mill, i. e. below about 70° C., the mix is removed from the mill, if desired, formed into shapes or spread or calendered onto a substrate, for example, onto the surface of a fabric, and then cured by heating, for example, in a press or mould or in hot air, for periods of not more than one hour at temperatures of about 100–150° C.

By using thermo-hardening phenol-formaldehyde condensation products, usually in amounts varying from about 5 to 20 parts per 100 parts by weight of the organic diisocyanate modified polyester or polyester-amide, in accordance with this invention cured rubber-like materials with improved properties are obtained. For instance, the improved materials may have a better tensile strength, an increased modulus, an increased hardness, greater resistance to softening by oils, and so forth. There is always an outstanding improvement in heat-ageing properties. This improvement is so marked that, as may be seen from comparative measurements of hardness after periods of exposure to elevated temperatures in the presence of air or oils, the use of the thermo-hardening condensation products in accordance with the invention substantially reduces or, in many cases, entirely prevents degradation of the cured materials on exposure to high temperatures.

The invention is illustrated but not limited by the following examples, in which the parts are expressed by weight.

Example 1

Mixes of the following components are made up on a two-roll rubber mill and then cured in a mould under hydraulic pressure at a temperature of 141° C. for 15 minutes:

|  | A | B |
|---|---|---|
| Diisocyanate modified polyester-amide | 100 | 100 |
| Hydroquinone | 2 | 2 |
| Carbon black | 60 | 60 |
| Stearic acid | 0.5 | 0.5 |
| Paraformaldehyde | 3 | 3 |
| Styrene dibromide | 2 | 2 |
| Alkaline condensed phenol-formaldehyde resin | | 5 |

Some of the properties of the cured materials are as follows:

|  | A | B |
|---|---|---|
| Shore hardness at 25° C | 53 | 60 |
| B. S. I. Hardness at 25° C | 67 | 60 |
| Resilience at 50° C | 62.1 | 57.7 |

The improvement in ageing properties resulting from the presence of the phenol-formaldehyde resin is shown in the following table:

| Ageing in Air at 120° C. | B. S. I. Hardness at 25° C. | |
|---|---|---|
|  | A | B |
| 1 day | 117 | 72 |
| 3 days | 154 | 90 |
| 7 days | 174 | 99 |
| 14 days | 173 | 107 |
| 21 days | (¹) | 97 |
| 28 days | | 101 |

¹ Too soft to test.

Similar results are obtained by using 7 instead of 3 parts of paraformaldehyde and 1.5 parts of phthalic anhydride in place of the 2 parts of styrene dibromide.

The alkaline condensed phenol-formaldehyde resin used in this example is obtained by refluxing for 15 minutes a mixture of 100 parts of phenol, 124 parts of 37% aqueous formaldehyde solution and a little sodium hydroxide solution.

Example 2

Mixes of the following components are made up on a two-roll rubber mill and then cured in a mould under hydraulic pressure at a temperature of 125° C. for 30 minutes.

|  | A | B |
|---|---|---|
| Diisocyanate modified polyester-amide | 100 | 100 |
| Hydroquinone | 2 | 2 |
| Carbon black | 60 | 60 |
| Stearic acid | 0.5 | 0.5 |
| Paraformaldehyde | 5 | 5 |
| 1-bromo-2-naphthol | 1.5 | 1.5 |
| Butylated-diphenylolpropane-formaldehyde resin | | 5 |

Some of the properties of the cured materials are as follows:

|  | A | B |
|---|---|---|
| Tensile strength, Kg./cm.² | 164 | 170 |
| Elongation at break, percent | 487 | 433 |
| Modulus at 300% extension | 82 | 82 |
| Resilience at 50° C | 58.0 | 60.1 |
| Shore hardness at 25° C | 55 | 53 |
| B. S. I. hardness at 25° C | 59 | 61 |

The improvement in ageing properties resulting from the presence of the butylated-diphenylolpropane-formaldehyde resin is shown in the following table:

| Ageing in air at 120° C. | B. S. I. hardness at 25° C. | |
|---|---|---|
|  | A | B |
| 1 day | 41 | 38 |
| 3 days | 58 | 52 |
| 7 days | 91 | 64 |
| 14 days | 140 | 86 |
| 21 days | (¹) | 89 |
| 28 days | | 88 |
| 35 days | | 90 |
| 42 days | | 83 |

¹ Too soft to test.

The butylated - diphenylolpropane - formaldehyde resin used in this example is made by heating 536 parts of diphenylolpropane, 720 parts of 37% aqueous formaldehyde solution, 640 parts of butanol, 400 parts of xylene and 100 parts of 4% aqueous sodium hydroxide solution at refluxing temperature for 4 hours. The mixture is then distilled azeotropically for 14¼ hours to remove water, the organic liquids being separated from the distillate and returned to the reaction vessel throughout the distillation. 18 parts of phthalic anhydride are then added to the contents of the reaction vessel and the azeotropic distillation is continued as before for a further 3 hours. The resin is isolated by removing the organic liquids in vacuo.

Example 3

Mixes of the following components are made up on a two-roll rubber mill and then cured in a mould under hydraulic pressure at a temperature of 141° C. for 15 minutes:

|  | A | B | C |
|---|---|---|---|
| Diisocyanate modified polyester-amide | 100 | 100 | 100 |
| Hydroquinone | 2 | 2 | 2 |
| Carbon black | 60 | 60 | 60 |
| Stearic acid | 0.5 | 0.5 | 0.5 |
| Paraformaldehyde | 3.5 | 3.5 | 3.5 |
| Styrene dibromide | 1.5 | 1.5 | 1.5 |
| Diphenylolpropane-formaldehyde resin | | 5 | |
| Alkaline condensed phenol-formaldehyde resin (as used in Example 1) | | | 5 |

The improvement in ageing properties resulting from the presence of the resins is shown in the following table:

| Ageing in Air at 120° C. | B. S. I. Hardness at 25° C. | | |
|---|---|---|---|
| | A | B | C |
| Unaged | 65 | 50 | 57 |
| 1 day | 51 | 35 | 40 |
| 3 days | 107 | 47 | 62 |
| 7 days | 186 | 57 | 90 |
| 14 days | 204 | 60 | 105 |

The diphenylolpropane-formaldehyde resin used in this example is made by heating 333 parts of diphenylolpropane, 420 parts of 36% aqueous formaldehyde solution and 8.4 parts of 50% aqueous sodium hydroxide solution under nitrogen at 95° C. for 42 minutes, cooling to 70° C. and maintaining this temperature for 4¾ hours. The batch is then neutralised with hydrochloric acid, washed with water and dried in vacuo.

*Example 4*

Mixes of the following components are made up on a two-roll rubber mill and then cured in a mould under hydraulic pressure at a temperature of 125° C. for 30 minutes:

| | A | B |
|---|---|---|
| Diisocyanate modified polyester-amide | 100 | 100 |
| Hydroquinone | 2 | 2 |
| Carbon black | 60 | 60 |
| Stearic acid | 0.5 | 0.5 |
| Paraformaldehyde | 5.0 | 5.0 |
| Styrene dibromide | 1.5 | 1.5 |
| Alkaline Condensed phenol-formaldehyde resin | | 10 |

Some of the properties of the cured materials are as follows:

| | A | B |
|---|---|---|
| Tensile strength, Kg./cm.² | 84 | 133 |
| Elongation at break, percent | 173 | 267 |
| Shore hardness at 25° C | 65 | 61 |
| Shore hardness at 25° C. after ageing for 21 days at 120° C | 29 | 62 |

The presence of the resin results in the production of a cured material with considerably improved heat-ageing properties, an increased tensile strength, elongation at break and modulus, as well as an improved resistance to softening by oil.

The alkaline condensed phenol-formaldehyde resin used in this example is made by heating at refluxing temperature for one hour a mixture of 47 parts of phenol, 123 parts of 36.8% aqueous formaldehyde solution and 4.5 parts of 32% aqueous sodium hydroxide, cooling the reaction mass and neutralising it with hydrochloric acid, separating the product, washing it with water and then drying it in vacuo.

The diisocyanate modified polyester-amide used in the above examples is made according to the recipe of Example 7 of the specification of British application No. 13,204/41 (U. S. Serial No. 466,356, filed Nov. 20, 1942) and is obtained as follows: 127.75 parts of adipic acid, 42.25 parts of ethylene glycol and 13.6 parts of monoethanolamine are heated together under carbon dioxide to 190° C. during seventeen hours and the mixture is then subjected to continuous azeotropic distillation with xylene at 180–190° C. for twenty-two hours. Most of the xylene is then removed by distillation at 185° C. A pale yellow syrup with a melt viscosity of 68 poises at 75° C. and an acid value of 9.6 mgm. KOH per gm. is obtained. This syrup slowly hardens to a soft, cream-colored wax.

This wax is treated in a steam heated internal mixer at 145° C. with 4–5% of hexamethylene diisocyanate (added in three portions at fifteen minute intervals). The so obtained diisocyanate modified polyester-amide is a soft, rubber-like material which does not harden on standing.

*Example 5*

Mixes of the following components are made up on a two-roll rubber mill and then cured in a mould under hydraulic pressure at a temperature of 141° C. for 15 minutes:

| | A | B |
|---|---|---|
| Diisocyanate modified polyester-amide | 100 | 100 |
| Hydroquinone | 2 | 2 |
| Carbon black | 60 | 60 |
| Stearic acid | 0.5 | 0.5 |
| Paraformaldehyde | 10 | 10 |
| Phthalic anhydride | 1.5 | 1.5 |
| Diphenylolpropane-formaldehyde resin made as described in Example 3 | | 20 |

Some of the physical properties of the cured materials are as follows:

| | A | B |
|---|---|---|
| Tensile strength, Kg./cm.² | 210 | 204 |
| Elongation at break, percent | 520 | 373 |
| Modulus at 300% extension | 90 | 152 |
| Shore hardness at 25° C | 50 | 54 |
| Shore hardness at 25° C. after ageing for 35 days in oil at 70° C | 36 | 68 |

The presence of the resin results in the production of a cured material with considerably improved resistance to softening by hot oil, with better heat-ageing properties and with an increased modulus.

The diisocyanate modified polyester amide used in this example is made according to the recipe of Example 1 of the specification of British Application No. 13,204/41 (U. S. Serial No. 466,356, filed Nov. 20, 1942) and is obtained as follows:

469 parts of ethylene glycol, 1314 parts of adipic acid, 91.5 parts of monoethanolamine and 200 parts of water are mixed together and heated with stirring whilst a stream of nitrogen is passed over the heated mixture, the temperature being raised during two hours to 170° C. The mixture is maintained at 170° C. for seven hours, after which time the distillation of water ceases. The temperature is raised to 180–190° C., the blanket of nitrogen being still maintained, and xylene is added continuously and distilled to remove all traces of water as a water-xylene azeotropic binary. After 36 hours the xylene distillate is clear, indicating the removal of all traces of water. The mixture is now heated for 3 hours at 180–190° C. in vacuo (20 mm./Hg) to remove the xylene. There is thus obtained a thick syrup which gradually crystallises on standing and which has an acid value of 16 mgm. KOH per gm. 1318 parts of this syrup are put into a steam heated internal-mixer and the temperature is raised to 130–140° C. 61½ parts of hexamethylene diisocyanate are then added, in small portions during one hour, whilst the temperature of the mixer is gradually raised to 170° C. The syrup gradually thickens to a tough, rubbery mass. The mixer is cooled to 100–130° C. and the so-obtained diisocyanate modified polyester-amide is removed.

We claim:

1. In the process of curing the reaction product of a hydrocarbon diisocyanate and a low molecular weight linear polymer with 3 to 10 parts of paraformaydehyde per 100 parts of the said reaction product and an acid curing catalyst, the said low molecular weight linear polymer being of the class consisting of polyesters containing recurring intralinear carboxylic ester groups and polyester-amides containing recurring intralinear carboxylic ester groups and recurring intralinear carbonamide groups, the ratio of said ester groups to said carbonamide groups being at least 1:1, the step which comprises effecting the compounding in the presence of 5 to 20 parts per hundred parts by weight of the said reaction product of a thermal-hardening phenol-formaldehyde condensation product derived from a phenol with more than two free positions ortho and para to the phenolic hydroxyl, the ratio of the paraformaldehyde to the said thermal-hardening phenol-formaldehyde condensation product being no more than 1:1.

2. The process of claim 1, characterized in that, subsequent to compounding, the mass is subjected to a temperature of 100° C. to 150° C. whereby to effect curing.

WILL FURNESS.
LYLE E. PERRINS.
WALTER FAIRBAIRN SMITH.

REFERENCES CITED

The following references are of record in the file of this patent:

UNITED STATES PATENTS

| Number | Name | Date |
| --- | --- | --- |
| 2,282,827 | Rothrock | May 12, 1942 |
| 2,333,917 | Christ et al. | Nov. 9, 1943 |
| 2,241,321 | Schlack | May 6, 1941 |
| 2,177,637 | Coffman | Oct. 31, 1939 |